(12) United States Patent
Fredericks et al.

(10) Patent No.: US 7,079,041 B2
(45) Date of Patent: Jul. 18, 2006

(54) LED AIRCRAFT ANTICOLLISION BEACON

(75) Inventors: Thomas M. Fredericks, Westbrook, CT (US); Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 140 days.

(21) Appl. No.: 10/718,772

(22) Filed: Nov. 21, 2003

(65) Prior Publication Data

US 2005/0110649 A1    May 26, 2005

(51) Int. Cl.
*G08B 5/22* (2006.01)
*B64D 47/06* (2006.01)
*F21S 8/10* (2006.01)

(52) U.S. Cl. ............... 340/815.45; 340/981; 340/983; 340/321; 362/470; 362/545; 362/800

(58) Field of Classification Search .......... 340/815.45, 340/981, 983
See application file for complete search history.

(56) References Cited

U.S. PATENT DOCUMENTS

| | | | |
|---|---|---|---|
| 5,519,596 A | 5/1996 | Woolverton | 362/250 |
| 5,642,933 A | 7/1997 | Hitora | 362/243 |
| 5,806,965 A | 9/1998 | Deese | 362/249 |
| 5,890,794 A | 4/1999 | Abtahi et al. | 362/294 |
| 6,183,100 B1 | 2/2001 | Suckow et al. | 362/35 |
| 6,414,801 B1 * | 7/2002 | Roller | 359/726 |
| 6,425,678 B1 | 7/2002 | Verdes et al. | 362/344 |
| 6,483,254 B1 | 11/2002 | Vo et al. | 315/241 |

* cited by examiner

*Primary Examiner*—Donnie L. Crosland
(74) *Attorney, Agent, or Firm*—Alix, Yale & Ristas, LLP

(57) ABSTRACT

An exemplary aircraft anticollision beacon is constructed around a faceted aluminum support cylinder and base. The support cylinder has an outside surface with ten vertically oriented substantially planar faces. An array of LEDs is mounted in thermally conductive relationship on each face of the support cylinder. Each LED is partially surrounded by a trough-shaped reflecting surface that re-directs off axis light into a horizontal plane. Axially aligned, radially adjacent reflecting troughs combine to form the circumferential reflecting troughs. The support cylinder and base are connected in thermally conductive relationship to define a thermal pathway from the LEDs to a heat radiation surface on the base. The base is also configured to act as a heat sink for heat generating components of the LED driver circuits. The exemplary beacon employs a distributed energizing circuit in which each driver is configured to energize two of the ten arrays of LEDs.

20 Claims, 2 Drawing Sheets

LED AIRCRAFT ANTICOLLISION BEACON

BACKGROUND OF THE INVENTION

1. Field of the Invention

This invention relates to a warning light and more specifically to an aircraft anticollision warning light employing light emitting diodes as a light source.

2. Description of the Related Art

To prevent collisions, aircraft operating at night utilize a variety of lights to attract the attention of other aircraft operating in the same airspace. One such lighting system is the anticollision lighting system. A typical anticollision lighting system consists of flashing lights installed at several points on the aircraft to ensure that the lighted aircraft is visible to other aircraft operating in the vicinity. Anticollision lights are typically mounted on the aircraft's upper and lower fuselage, the tail, and the wingtips. Each of these anticollision lights is required to have a particular light radiation pattern. For example, the anticollision beacons mounted to the top and bottom of the aircraft are required to have a 360° radiation pattern in a horizontal plane. The radiation pattern has an intensity that is highest within an angle of 5° above and below the horizontal plane.

Anticollision lights have previously been installed on aircraft for this purpose, but they suffer from several disadvantages. Prior anticollision lights commonly use incandescent lamps and flashers or "rotating beacon" mechanisms to create an attention-getting pattern of light. However, flashers and rotating beacons suffer from limited life due to lamp burnout and mechanism wear. The amount of light emitted from these anticollision lights is also relatively low, affording limited attention-getting light at distances from the aircraft.

Many flashers and rotating beacon lights have been replaced by "strobe" lights owing to the strobe's brilliant, sharp flash and high light output. Strobe lights offer increased service life over flashers and rotating beacons due to the lack of incandescent lamps and moving parts. In a typical strobe lighting system, aircraft electrical power is converted to a high-voltage direct current (DC) potential. The high-voltage DC is applied to a xenon gas lamp, which is "triggered" to arc between its anode and cathode terminals by a second voltage which is applied to the lamp's grid terminal. Although more reliable than flashers and rotating beacons, strobe lights still suffer from a relatively short service life due to degradation of the strobe's electronic components from the continuous high-voltage charge and discharge cycles associated with each flash of the lamp. This charge/discharge cycle also tends to produce RF noise that is undesirable for aircraft components.

Light emitting diodes ("LEDs") have previously been utilized for aircraft lighting, as shown in U.S. Pat. No. 6,203,180 to Fleischmann. However, Fleischmann teaches the use of light emitting diodes for interior cabin illumination, rather than exterior anticollision lighting, and does not address the attention-getting characteristics necessary for anticollision lights. U.S. Pat. No. 4,912,334 to Anderson discloses the use of light emitting diodes for anticollision lighting during covert aircraft operations. However, the requirements of anticollision lighting for covert and non-covert operations differ considerably. Covert operations require the use of infrared emitting diodes visible only to night vision imaging equipment. Further, the desired light output of covert anticollision lighting is of a comparatively low level and is intended to provide awareness only to other "friendly" aircraft operating in the immediate vicinity of the lighted aircraft. In contrast, the goal of non-covert visible-light anticollision lighting is to provide sufficient notice to other aircraft at distances from the lighted aircraft sufficient to avoid collisions by permitting emergency evasion procedures. There is a need for a strobe light that provides a sharp, bright pulse of visible light that can be seen at the significant distances desired for non-covert strobe anticollision lighting and which provides long operating life in the harsh aircraft environment.

U.S. Pat. No. 6,483,254 to Vo et al discloses an aircraft anticollision strobe light that employs LEDs arranged around the circumference of an electrically insulative, thermally conductive disc to form an LED light ring. Several LED light rings are stacked with electrically conductive rings placed between light rings. A control circuit applies current to the resulting stacked configuration. The '254 patent employs many densely packed LEDs to achieve the light intensity and radiation pattern required for an aircraft anticollision beacon. The massed LEDs of the '254 LED strobe light represent a typical, though inefficient use of LEDs as signaling light sources. The '254 LED strobe light is inefficient because a significant portion of the light produced by each LED is emitted in directions that do not reinforce the light emission from adjacent LEDs or the desired light radiation pattern. As a result, a great number of LEDs are required to meet the intensity standard for an aircraft anticollision beacon. Heat regulation always becomes a concern when using large numbers of closely packed LEDs. The configuration employed in the '254 patent is prone to overheating. Further, the '254 patent requires a power supply that provides current pulses sufficient to energize all of the LEDs in all of the rings to produce each desired light pulse. The requisite high amperage current requires a power supply with a robust design that is likely to increase costs. The high current power supply components will generate heat that must be dissipated to ensure reliable operation of the beacon. A further disadvantage is that a power supply necessary to generate the required high amperage current pulses may generate correspondingly large magnitude RF noise that may be difficult to filter.

There is a need in the art for an aircraft anticollision beacon that employs LEDs to efficiently meet the specified standard light intensity and radiation pattern for an anticollision beacon.

SUMMARY OF THE INVENTION

An efficient LED anticollision beacon is achieved by employing circumferential reflecting troughs to re-direct off axis light into the desired radiation pattern. Capturing more light from each LED permits fewer LEDs to provide the required light intensity and pattern. Fewer LEDs reduces the part count of the assembly, reduces power consumption and reduces heat dissipation requirements.

An exemplary aircraft warning beacon is constructed around a faceted aluminum support cylinder and base. The support cylinder has an outside surface with ten vertically oriented substantially planar faces. An array of LEDs is mounted in thermally conductive relationship on each face of the support cylinder. Each LED is partially surrounded by a trough-shaped reflecting surface that re-directs off axis light into a horizontal plane. Axially aligned, radially adjacent reflecting troughs combine to form the circumferential reflecting troughs. The circumferential reflecting troughs allow light form axially aligned, radially adjacent LEDs to overlap and combine so that the beacon appears to be a single light source. The reflecting surfaces are carried by reflectors configured to cover two LED arrays and two support cylinder faces.

The support cylinder and base are connected in thermally conductive relationship to define a thermal pathway from the LEDs to a heat radiation surface on the base. The base is also configured to act as a heat sink for heat generating components of the LED driver circuits. The exemplary beacon employs a distributed energizing circuit in which each driver is configured to energize two of the ten arrays of LEDs.

The optical, thermal and electrical design of the exemplary beacon combine to produce a cost effective and durable alternative to strobe anticollision beacons.

DETAILED DESCRIPTION OF AN EXEMPLARY EMBODIMENT

Figure 1:
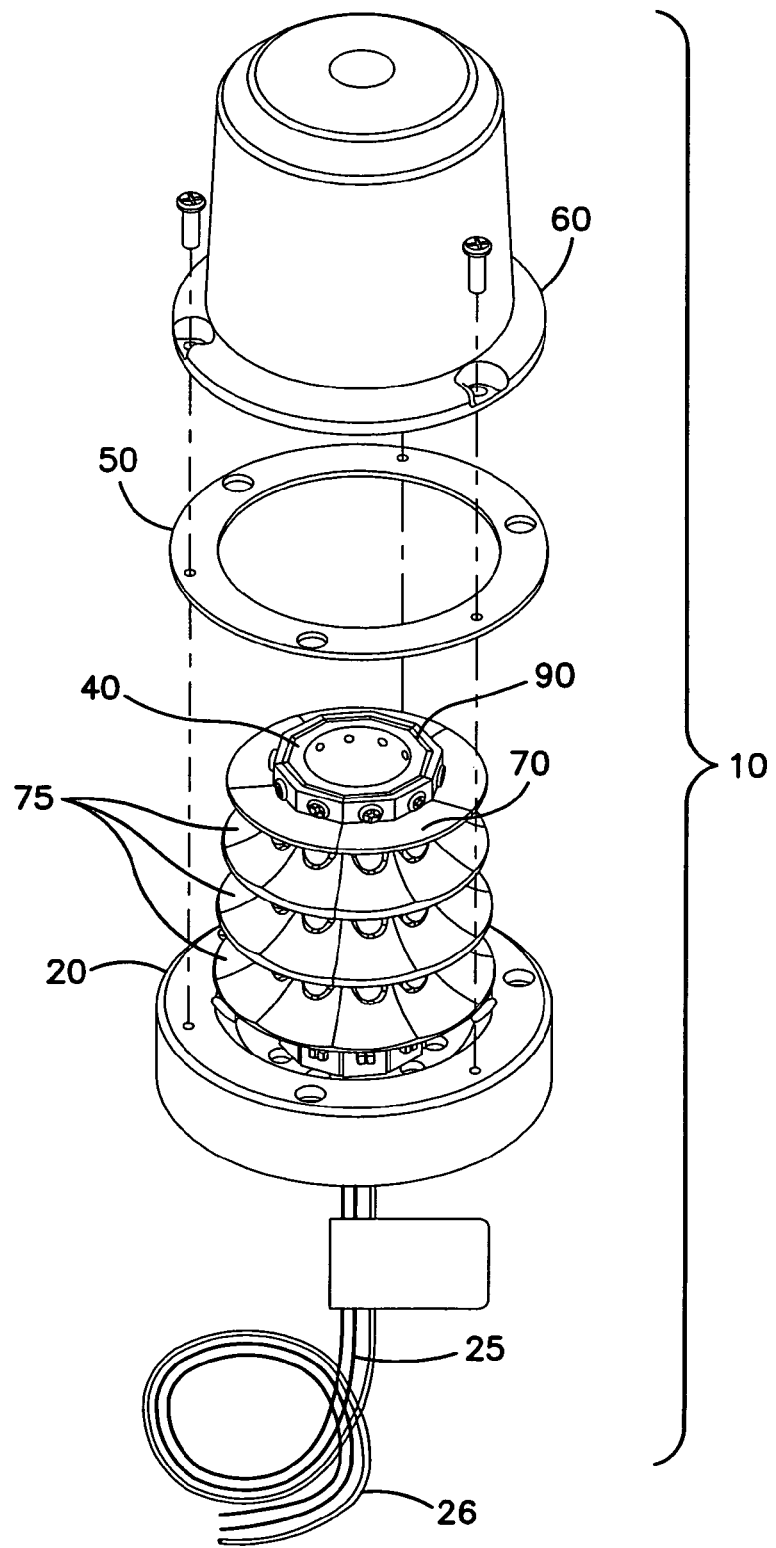
FIG. 1 is a partially exploded perspective view of an exemplary anticollision beacon illustrative of aspects of the present invention.
Figure 2:
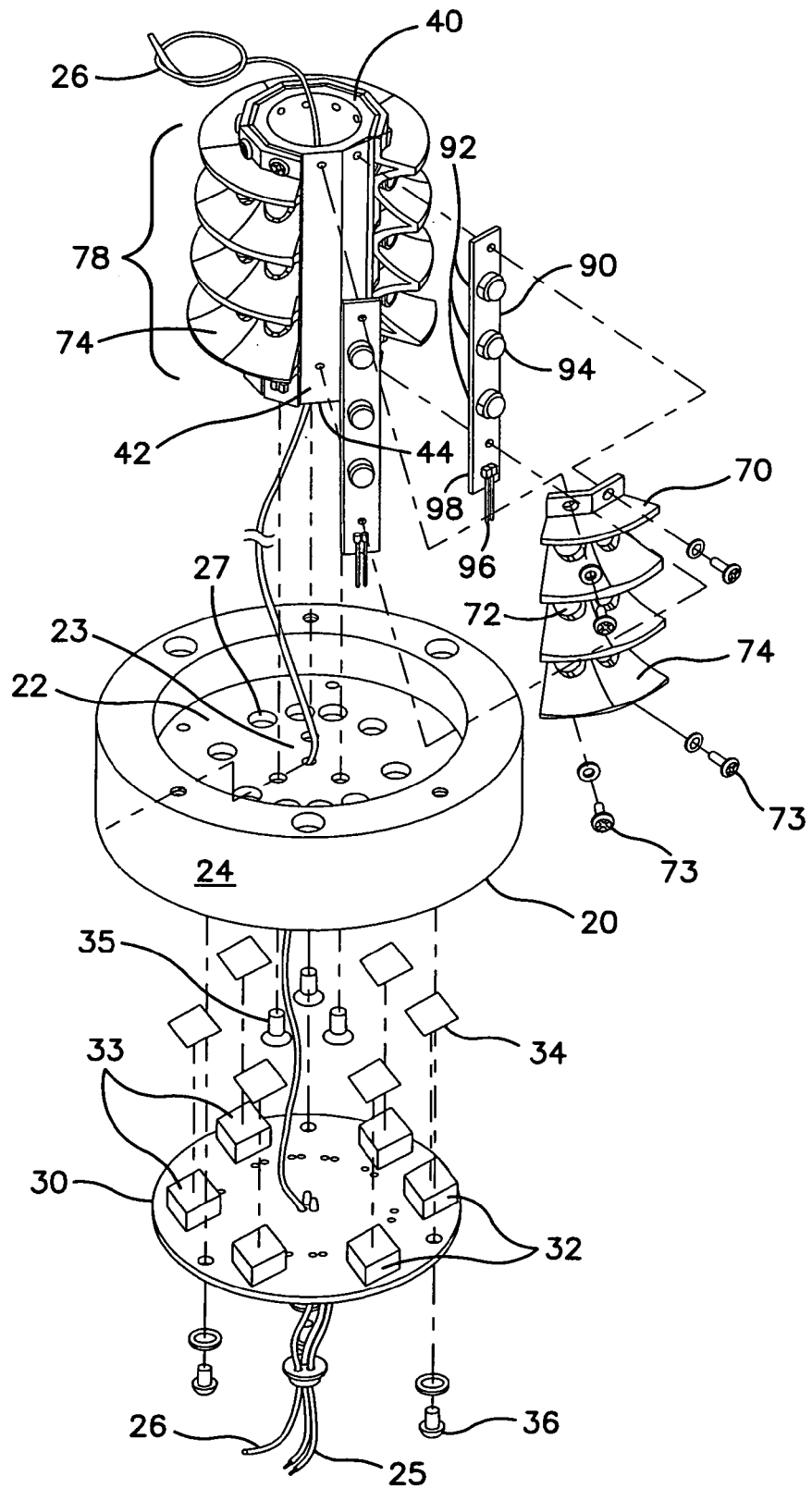
FIG. 2 is an exploded perspective view of the anticollision beacon of FIG. 1.

An exemplary embodiment of an anticollision beacon illustrative of aspects of the present invention will be described with reference to FIGS. 1 and 2. FIG. 1 shows the assembled anticollision beacon 10 with the associated lens 60 and gasket 50. FIG. 2 is a detailed exploded view of the anticollision beacon 10. The configurations of the selected components and their assembled relationships are selected to provide an anticollision beacon that is extremely rugged and energy efficient while meeting all applicable performance standards.

To achieve the required lighting intensity and radiation pattern in a light source utilizing LEDs, it is necessary to use multiple discrete LEDs. One approach to using multiple LEDs to provide an anticollision beacon has been described with reference to U.S. Pat. No. 6,483,254. Heat dissipation is a major consideration because modern high-output LEDs produce significant quantities of heat and LEDs are temperature-sensitive components that degrade and prematurely fail when exposed to temperatures in excess of approximately 110° C. for any significant length of time. Therefore, when concentrating many LEDs in a small space, it is necessary to provide a thermal design that will conduct heat away from the LEDs.

An aspect of the present invention relates to the thermal design of the anticollision beacon. With reference to FIG. 2, a thermally conductive base 20 and thermally conductive support cylinder 40 provide primary structural support to the anticollision beacon components. In the illustrated embodiment, the base 20 and the support cylinder 40 are machined from aircraft grade aluminum. The aluminum is lightweight, very strong and highly thermally conductive. In the illustrated embodiment 10, the support cylinder 40 and base 20 are formed as separate components. The illustrated support cylinder 40 is a thick-walled, tube-like structure with an exterior surface having a plurality of vertical faces 42. In the illustrated embodiment, ten substantially identical planar faces 42 are formed on the outside surface of the support cylinder 40. While the number of faces 42 may vary, it will be understood that to achieve a symmetrical lighting pattern, the anticollision beacon 10 will typically display symmetry about its radial circumference.

The bottom surface 44 of the thick-walled support cylinder 40 is provided with threaded fastener bores (not shown). The support cylinder 40 is fixed to the base 20 by three fasteners 35 through bores defined by the base 20. Heat sink compound applied at the support cylinder 40/base 20 interface enhances thermal transfer between the support cylinder 40 and the base 20 (FIG. 2 at 23). The base 20 extends radially beyond the support cylinder 40 and provides a radially extending flange surface for mounting the gasket 50 and lens 60. Below the gasket 50 and lens 60 the base 20 provides a significant heat radiation surface 24 extending around the circumference of the anticollision beacon 10. This heat radiation surface 24 is exposed to airflow when the beacon is mounted to an aircraft. Together, the support cylinder 40 and the base 20 with its heat radiation surface 24 provide an efficient pathway for heat transfer away from the various heat-generating components of the anticollision beacon 10 as will be described below.

The illustrated exemplary embodiment employs Luxeon™ emitters manufactured by LUMILEDS™ of San Jose, Calif. The LEDs 94 are of the high-dome or lambertian lens configuration. This lens shape has a viewing angle of approximately 140°. The term "viewing angle" describes the off-axis angle from the lamp center line (optical axis of the lens) where the luminous intensity is one-half of the peak value. A large viewing angle number indicates that a significant quantity of the light produced by the LED is emitted at relatively large angles to the lamp center line. The lighting standard for anticollision beacons specifies the intensity of the light pattern relative to a horizontal plane through the beacon. The greatest intensity is required to be within an angle of 5° above or below this horizontal plane. The required intensity declines relative to this horizontal plane, reaching its minimum at an angle 20–30° above or below the horizontal plane. Thus, light emitted at angles in excess of approximately 30° relative to this horizontal plane cannot contribute to meeting the requisite standard.

An aspect of the present invention relates to placing each LED light source 94 at the bottom of a trough-like reflecting surface that extends around the circumference of the support cylinder 40. The reflecting surface 74 is configured to re-direct "axially remote" or "off axis" light from each LED in a direction substantially parallel to a horizontal plane passing through the beacon (assuming the support cylinder is vertical). This reflecting surface 74 configuration increases the efficiency of each LED 94 by re-directing axially remote light generated by each LED into a direction calculated to meet the light radiation requirements for an anticollision beacon. This allows the exemplary embodiment to meet the required radiation intensities for a Class 1 rotor craft anticollision beacon or a Class 3 fixed wing and rotor craft anticollision beacon with only 30 Luxeon LEDs. Meeting the light radiation and intensity requirements with fewer LEDs makes the beacon more energy efficient, while lessening the thermal dissipation requirements and permitting a less robust power supply design. All of these factors make the exemplary beacon more cost effective.

The LEDs 94 are mounted in groups of three to metal-core PC boards 90. The metal-core PC boards 90 are configured to have a shape substantially the same as each of the ten faces 42 of the support cylinder 40. The substantially planar rear surface 98 of each metal-core PC board 90 is mounted against the substantially planar face 42 of the support cylinder 40 with a heat sink compound between the PC board and the support cylinder immediately beneath each LED (reference numeral 92 in FIG. 2). The heat sink compound improves thermal conductivity between the PC board 90 and the support cylinder 40. The exemplary thermal design provides an efficient thermal pathway between the slug of each LED 94 and the support cylinder 40.

In the exemplary embodiment 10, five reflectors 70 mount over the PC boards 90 and are fixed to the support cylinder 40 by threaded fasteners 73. Each of the five reflectors 70 is configured to cover two PC boards 90. Each reflector 70 therefore defines six LED openings 72 and six trough-shaped reflecting surfaces 74 in three open-ended rows. As best seen in FIG. 1, when the reflectors 70 are installed over the PC boards 90, the LEDs 94 project through the LED openings 72 at the bottom of each trough-shaped reflecting surface 74. The reflectors 70 define three open-ended, circumferentially extending rows of two reflecting surfaces 74.

The three reflector trough rows are configured to meet at their open circumferential ends with adjacent reflectors 70 to define three segmented circumferential reflector troughs 75. Each reflector trough includes ten LEDs 94 in a circumferential row. The reflecting surface 74 for each LED is configured in a modified parabolic shape. As best seen in FIG. 2, the reflecting surface 74 has a compound concave configuration. As the reflecting surface progresses circumferentially away from the optical axis of each LED 94, the reflecting surface is curved upwardly or downwardly to more effectively re-direct the axially remote light incident upon that portion of the reflecting surface to a trajectory substantially parallel to the horizontal plane. It will be understood that this compound reflecting trough configuration is more efficient than a simpler circumferentially smooth reflecting surface. The circumferentially open ended reflecting troughs 75 allow axially remote light from the LEDs that is substantially parallel to the horizontal plane to overlap and reinforce the beacon light radiation pattern. This configuration provides an anticollision beacon which appears to be a single light source when viewed from a distance, even though a reduced number of high-output LEDs 94 are utilized.

A further aspect of the present invention relates to the configuration of the electrical circuits that provide energizing current to the LEDs. The exemplary beacon 10 includes five driver circuits, each configured to drive six LEDs. Thus, each driver circuit energizes the LEDs 94 mounted to two of the ten PC boards 90. This distributed driver arrangement has a number of advantages. First, failure of any single driver circuit extinguishes only one fifth of the LEDs, dramatically reducing the possibility of total collision beacon failure. Additionally, since each driver needs to energize only six LEDs, the current production capacity of the driver components is relatively small. This allows use of relatively inexpensive components in each driver circuit. Further, low current output produces RF noise of low magnitude that is relatively easy to filter. The exemplary embodiment employs an analog configuration (as opposed to a pulse width modulated PWM configuration) to further reduce RF noise. The resulting beacon is virtually RF silent.

As best seen in FIG. 2, the driver circuits are arranged on a circular PC board 30 with the heat-generating driver components 32 on the PC board's upper surface. The PC board 30 is configured to mount in a cavity below and substantially surrounded by the base 20. The heat-generating driver circuit components 32 have a heat-transfer surface 33 arranged parallel to the bottom of the base 20. The PC board 30 is mounted with electrically insulating, thermally conductive "co-therm" gasket material 34 between the heat transfer surface 33 of each heat-generating component 32 and the aluminum base 20. Thus, the aluminum base 20 provides an efficient thermal pathway to transfer heat away from the driver circuit components 32 as well as from the LED light sources 94.

The assembly sequence for the exemplary anticollision beacon is as follows:

1. The PC boards 90 and reflectors 70 are assembled to the support cylinder 40 with a small amount of heat sink compound between each metal-core PC board 90 and the support cylinder face 42 beneath each LED (FIG. 2 at 92).

2. The completed light assembly 78 is then mounted to the base 20 with heat sink compound between the mating surfaces of the base 20 and support cylinder 40 (FIG. 2 at 23). Electrical leads 96 from each metal core PC board 90 extend through a corresponding opening 27 in the base 20. The diameter of the openings 27 is selected to provide clearance around the electrical leads 96.

3. The circular PC board 30 carrying the driver circuits is aligned with and electrically connected to the leads 96 extending from the LED-carrying metal core PC boards 90. The circular PC board 30 is mounted to the base 20 by fasteners 36 with co-therm gasket material between the heat generating components 32 and the lower surface of the base 20.

4. The bottom portion of the base 20 is then filled with potting material to seal the electronic components against moisture intrusion and improve the assembly's vibration resistance.

As shown in FIG. 1, the light assembly 78 is covered with a lens 60 and a gasket 50 to seal the beacon 10 against the environment. Since the anticollision beacon 10 is mounted to an aircraft, it must be able to withstand extreme changes in pressure. A small-gage tube 26 provides pressure relief for the sealed area beneath the lens 60. As best shown in FIG. 2, the tube 26 has one open end inside the support cylinder 40 and another open end extending into the aircraft with the electrical wires 25. The small tube 26 extends through the potting material in the base 20.

The driver circuits may be provided with a programmable control chip. The control chip may include memory for storing a plurality of flashing patterns. When power is applied to the anticollision beacon, the control chip actuates the driver circuitry to provide pulses of current to the LEDs to produce flashing warning light patterns.

While an exemplary embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An anticollision beacon comprising:
   a generally cylindrical, thermally conductive support having an axis and a bottom surface;
   a plurality of LEDs mounted in thermally conductive relationship to said support, each of said LEDs having an optical axis;
   a plurality of reflectors secured to said support, said reflectors defining openings for each of said LEDs, said openings located in an open ended radially oriented trough defined by the reflector; and
   a thermally conductive base including a support surface for mounting said support in thermally conductive relationship to said base,
   wherein said support and said base provide a thermal pathway for heat generated by said LEDs, and the optical axes of said plurality of LEDs are substantially perpendicular to said support axis.

2. The anticollision beacon of claim 1, comprising:
   a cup-shaped lens configured to cover said support, said LEDs and said reflectors and mount to said base, wherein said base includes a peripheral heat radiating surface not covered by said lens.

3. The anticollision beacon of claim 1, wherein said thermally conductive support is axially symmetrical and has a polygonal exterior surface defining a plurality of axially extending, substantially planar faces.

4. The anticollision beacon of claim 1, comprising:
a thermally conductive PC board having a rear surface opposite said LEDs,
wherein said LEDs are mounted in thermally conductive relationship to said PC board and said PC board rear surfaces are held against said support by said reflectors.

5. The anticollision beacon of claim 1, wherein said thermally conductive support has a polygonal exterior surface defining a plurality of axially extending, substantially planar faces and said anticollision beacon comprises:
a thermally conductive PC board having a substantially planar rear surface mounted in thermally conductive contact with one of said planar faces; and
a subset of said plurality of LEDs mounted in thermally conductive relationship to said PC board.

6. The anticollision beacon of claim 5, wherein each said reflector spans more than one PC board and each said trough includes openings for radially adjacent LEDs.

7. The anticollision beacon of claim 1, wherein said openings are located at a radially inward most point of said trough and said troughs are segmented into semi-parabolic reflecting surfaces centered on each LED.

8. The anticollision beacon of claim 1, wherein said reflector troughs define segmented reflecting surfaces with each segment centered on an LED.

9. The anticollision beacon of claim 1, wherein each said LED radiates light in a hemispherical pattern, said radiated light including axially close light and axially remote light, said trough defining a reflecting surface configured to redirect said axially remote light into a direction substantially parallel to a plane including said optical axes.

10. The anticollision beacon of claim 4, wherein said PC boards are metal core PC boards and said support is aluminum.

11. A method for providing an anticollision beacon comprising:
providing an axially extending thermally conductive support, said support having an a polygonal exterior surface with a plurality of substantially identical planar faces;
providing a plurality of substantially identical LED arrays, each of said arrays comprising:
a thermally transmissive PC board with a substantially planar rear surface complementary in configuration to each of said faces; and
a plurality of spaced apart LEDs mounted to a front surface of said PC board in thermally conductive relationship to said PC board;
providing a plurality of reflectors defining a pattern of openings coinciding with the LEDs of at least one of said arrays and reflecting surfaces adjacent said openings;
arranging one said array on each of said faces with said rear surface in thermally conductive relationship to said support;
providing a thermally conductive base with a support mounting surface;
securing a plurality of reflectors over said arrays with said LEDs aligned with said openings such that said PC boards are intermediate said reflector and said support and light from said LEDs is incident upon said reflecting surfaces; and
mounting said support in thermally conductive relationship to said base.

12. The method of claim 11, wherein said step of securing comprises:
fastening said reflector to said support at axially spaced locations with fasteners passing through apertures in said reflector and said PC board.

13. The method of claim 11, wherein said step of arranging comprises:
applying heatsink compound to said rear surface at locations opposite said LEDs.

14. An anticollision beacon comprising:
a thermally conductive support having an exterior surface including a plurality of substantially planar faces symmetrically arranged about an axis;
an array of LEDs mounted in thermally conductive relationship to each of said faces, each of said LEDs having an optical axis and a light radiation pattern surrounding said optical axis;
a plurality of reflectors secured to said support, each of said reflectors defining a plurality of openings aligned with the LEDs of at least one array and including a reflecting surface, one of said LEDs being received in each of said openings;
a thermally conductive base in thermally conductive relationship with said support, said base extending radially outwardly of said reflectors; and
a circuit for providing electrical current to energize said LEDs,
wherein said LEDs emit light when energized, said light including axially close light having a trajectory at an angular displacement from said optical axis of less than 20° and axially remote light having a trajectory at an angular displacement from said optical axis of greater than 20°, a portion of said axially remote light being redirected by said reflecting surface to a trajectory substantially perpendicular to a plane including the optical axes of axially aligned of said LEDs.

15. The anticollision beacon of claim 14, wherein said reflecting surface defines a trough made up of reflecting surface segments each centered on an LED.

16. The anticollision beacon of claim 14, wherein at least one LED of at least one array is axially aligned with at least one LED of an adjacent array and said reflector defines an open ended trough which allows some of the light emitted by said axially aligned LEDs of adjacent arrays to overlap.

17. The anticollision beacon of claim 14, wherein said support is a faceted cylinder having a circumference, at least one LED of each array is axially aligned with at least one LED of a circumferentially adjacent array and said reflector defines an open ended trough which allows some of the light emitted by said axially aligned LEDs of circumferentially adjacent arrays to overlap.

18. The anticollision beacon of claim 17, wherein the optical axes of axially aligned LEDs project radially outwardly from said support in a plane perpendicular to said axis.

19. The anticollision beacon of claim 14, wherein each said reflector covers a plurality of arrays.

20. The anticollision beacon of claim 15, wherein said reflectors surround said support to provide a substantially uninterrupted reflecting surface.

* * * * *

UNITED STATES PATENT AND TRADEMARK OFFICE
CERTIFICATE OF CORRECTION

| | |
|---|---|
| PATENT NO. | : 7,079,041 B2 |
| APPLICATION NO. | : 10/718772 |
| DATED | : July 18, 2006 |
| INVENTOR(S) | : Fredericks et al. |

It is certified that error appears in the above-identified patent and that said Letters Patent is hereby corrected as shown below:

Column 8:

Lines 40-41, delete "substantially perpendicular to a plane including the optical axes of axially aligned of said LEDs" and insert --substantially parallel to a plane including the optical axes of said axially aligned LEDs--

Signed and Sealed this

Twenty-seventh Day of February, 2007

JON W. DUDAS
*Director of the United States Patent and Trademark Office*